July 28, 1931.   G. M. EATON   1,816,474

HOUR GLASS BEARING

Filed Jan. 19, 1927

WITNESSES:
E. G. McCloskey
O. B. Buchanan

INVENTOR
George M. Eaton.
BY Wesley G. Carr
ATTORNEY

Patented July 28, 1931

1,816,474

UNITED STATES PATENT OFFICE

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA

HOUR GLASS BEARING

Application filed January 19, 1927. Serial No. 162,082.

My invention relates to bearings and it has particular relation to bearings which are not otherwise self-alining and which are not lubricated by the oil pressure feed system.

The principal object of my invention is to improve the operation of bearings of the type just mentioned by preventing excessive contact pressures at restricted spots, particularly at spots located near the ends of the bearing where it is difficult to lubricate the same.

When a new bearing is being run in, as on a railway motor, it has been found by experience that there is a pronounced tendency to develop hard local contact at the ends of the bearing. There are a number of contributory causes for this effect, as deflections due to unequal temperatures in various parts of the shell, shaft angularity due to bearing clearances, and shaft deflection.

In order to overcome the tendency to develop hard local contact at the ends of the bearing, stepped bearing shells have been made in which the portions near the ends have a diameter which is larger, by a few thousandths of an inch, than the usual diameter at the middle zone. Local hard contacts still occur at the edges of the steps, and while the local hard contacts are much more tolerable there than at the ends of the bearing where the lubricating conditions are worse, it would be much better to still further reduce the possibility and intensity of local hard contacts.

With the foregoing objects in view, my invention consists in the utilization of an hour-glass bearing shell which gradually increases in diameter from the central zone of the bore toward the ends of the bearing, so that the ends of the bearing are a few thousandths of an inch larger in diameter than the central bore, the surface of the bored hole being a hyperboloid of revolution having no stepped points in its contour.

My invention also includes novel practical methods of making such hyperboloid bores, and other details, as set forth in the following description and claims.

In the drawings, Fig. 1 is a longitudinal sectional view through a journalled bearing embodying the principles of my invention, the amount of curvature of the bore in the bearing shell being greatly exaggerated for the purpose of illustration, the section being indicated by the line I—I in Fig. 2;

Figure 1:
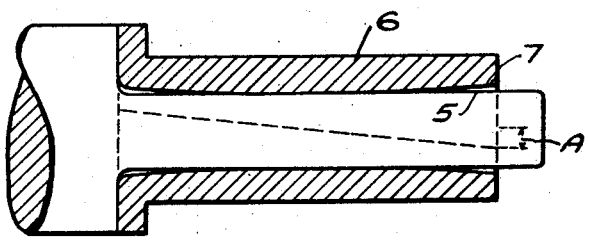

The bearing shown in Fig. 1 comprises a shaft having a cylindrical journal portion 5 and a bearing shell or brass 6 having a bore 7 which is a hyperboloid of revolution, the diameter of the bore at the ends of the shell being larger, by a few thousandths of an inch, than the minimum diameter at an intermediate point.

The resultant brass has the advantage of offering a smooth compensation for slight mis-alinements or deflections of the shaft and of causing any local hard contacts which develop to be not only located near the centre of the bearing where the lubrication is the best, but also, owing to the curved contour of the bore, to be much larger in area than is the case with stepped bearings, or with bearings where the local hard contacts are at the edge of a sharp change in diameter of the bore.

Figure 2:
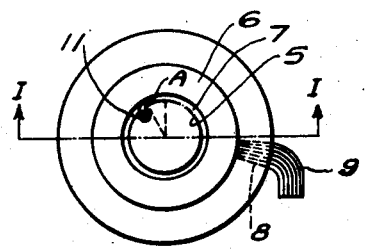
Fig. 2 is an end elevation thereof.
Figure 3:
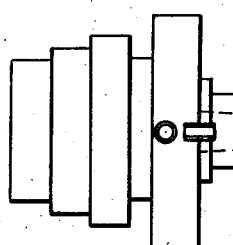
Fig. 3 is a fragmentary plan view of a novel lathe which is particularly adapted to cut the bearing shell of my invention.
Figure 4:
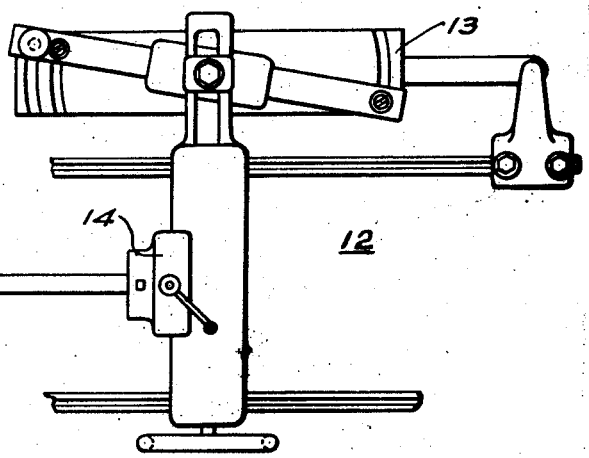
Fig. 4 is a fragmentary vertical elevation of the lathe.
Figure 4:
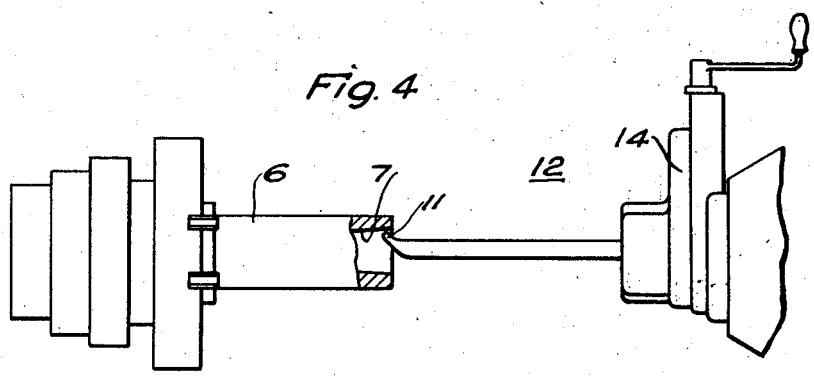

The bearing shell 6 is preferably provided, intermediate the ends thereof, with a lubricating window 8, as shown in Fig. 2, through which oil or other lubricant is supplied by means of a wick or waste 9, as is customary in railway motors.

To cut the hour glass bore in my bearing shell, I prefer to employ a method using standard shop equipment by means of which the boring tool 11 travels in a straight line but generates a hyperboloid of revolution. The tool is set up on a standard lathe 12 having a taper attachment 13 which displaces the cutting tool in a lateral horizontal direction as the cutting tool is advanced axially in a longitudinal horizontal direction. In a standard taper-attachment lathe, the tool is set to cut on the horizontal axial plane, as for turning or boring a taper. According to my invention, however, the cutting tool 11 is mounted on an overhead tool-supporting standard 14, which causes the tool to cut on the top, in the vertical radial plane at the mid-length of the bearing.

For example, if one wishes to turn a hyperbolic bore 6″ in diameter at the mid length and 6.010″ in diameter at the ends, the cutting tool is offset by $$A, \text{(Figs. 1 and 2)} = \sqrt{3.005^2 - 3^2} = .173''.$$

The tool can be set to the correct height by starting a straight bore to a checked diameter of 6″ and then the taper offset may be swung to an angle and the bore started .173″ off the vertical central line. The contour of the bore will then be the desired hyperboloid of revolution.

For quantity production, the whole set-up can be held constant and the accuracy can be checked by measuring the bores at the ends and mid-points by micrometers or by plug gauges. It will also be advantageous to standardize a single angular tool travel for all bearings of various sizes.

While I have described my bearing shell as being bored on a special lathe apparatus, I do not wish to be understood as implying that the shell may not be bored on a boring mill or other appropriate apparatus; and while I have described the process of utilizing a tool having a straight line travel in an angular direction, I do not wish to be understood as implying that I may not utilize a curved guide or other means for causing the tool to make the desired cut.

I claim as my invention:

1. An oil-film-wick-lubricated bearing for a cylindrical journal comprising a bearing brass having a bearing surface generated as a hyperboloid of revolution with the axis of the bearing normal to the axis of the generating hyperbola.

2. An oil-film non-pressure-feed bearing for car axles comprising a cylindrical journal and a bearing brass having, for a bearing surface, a surface such as would be generated by a hyperbola revolved about the axis of the bearing.

3. A non-pressure-feed oil-film journal bearing for railway cars comprising a cylindrical journal and a bearing brass having its bearing surface circular in cross-section and hyperbolic in longitudinal section, the maximum difference in diameter being of the order of one-hundredth of an inch.

In testimony whereof, I have hereunto subscribed my name this 11th day of January 1927.

GEORGE M. EATON.